United States Patent [19]
Rodal et al.

[11] Patent Number: 5,594,453
[45] Date of Patent: Jan. 14, 1997

[54] GPS RECEIVER HAVING A RAPID ACQUISITION OF GPS SATELLITE SIGNALS

[75] Inventors: Eric B. Rodal, Cupertino; Dominic G. Farmer, Milpitas; Chung Y. Lau, Sunnyvale, all of Calif.

[73] Assignee: Trimble Navigation, Ltd, Sunnyvale, Calif.

[21] Appl. No.: 332,958

[22] Filed: Nov. 1, 1994

[51] Int. Cl.$^6$ .................................................. G01S 5/02
[52] U.S. Cl. ........................................... 342/357; 342/352
[58] Field of Search ................................... 342/357, 352, 342/386

[56] References Cited

U.S. PATENT DOCUMENTS

| | | |
|---|---|---|
| 4,423,419 | 12/1983 | Johannessen ............................. 343/387 |
| 4,677,441 | 6/1987 | Höfgen et al. .......................... 342/174 |
| 4,968,981 | 11/1990 | Sekine et al. . |
| 5,036,329 | 7/1991 | Ando . |
| 5,059,969 | 10/1991 | Sakaguchi et al. . |
| 5,203,030 | 4/1993 | Kawasaki . |
| 5,222,245 | 6/1993 | Ando et al. . |
| 5,296,861 | 3/1994 | Knight . |
| 5,323,164 | 6/1994 | Endo . |

*Primary Examiner*—Thomas H. Tarcza
*Assistant Examiner*—Dao L. Phan
*Attorney, Agent, or Firm*—David R. Gildea

[57] ABSTRACT

A GPS receiver having a rapid acquisition of a GPS satellite signal when a normal operational mode is entered after a low power standby mode. The GPS receiver includes an RF section for receiving the GPS satellite signal and providing an GPS IF signal, a correlator section for providing a correlation signal for the correlation between the GPS IF signal and a GPS replica signal, and a microprocessor section for receiving the correlation signal and calculating a geographical location of the GPS receiver. The GPS replica signal is based upon a reference frequency from a reference oscillator and a reference time from a timer. In the standby mode, the operation of the RF section, correlator section, and microprocessor section is inhibited while the reference oscillator and time continue to operate. In order to increase acquisition speed upon entering the normal mode, the microprocessor section provides the correlator section with an initial frequency adjustment to correct for drift in the reference frequency during the standby mode. The microprocessor section provides the initial frequency adjustment based upon a learned frequency correction that is based upon the frequency adjustment that results in acquisition of the GPS satellite signal after alternating one or more times between the standby mode and the normal mode. Alternately, the initial frequency adjustment is calculated from a stored frequency/temperature relationship and a temperature for the reference oscillator measured by a temperature sensor.

17 Claims, 6 Drawing Sheets

KEY TO FIGURE 1

Table for frequency/temperature relationship

| Temperature | Frequency variation in ppm |
|---|---|
| -40 | -7.5 |
| -35 | -3.5 |
| -30 | -0.3 |
| -25 | 2.3 |
| -20 | 4.1 |
| -15 | 5.3 |
| -10 | 6.0 |
| -5 | 6.1 |
| 0 | 5.7 |
| 5 | 5.0 |
| 10 | 4.0 |
| 15 | 2.7 |
| 20 | 1.2 |
| 25 | -0.3 |
| 30 | -1.8 |
| 35 | -3.4 |
| 40 | -4.7 |
| 45 | -5.9 |
| 50 | -6.9 |
| 55 | -7.6 |
| 60 | -7.9 |
| 65 | -7.7 |
| 70 | -7.1 |
| 75 | -5.9 |
| 80 | -4.1 |
| 85 | -1.6 |

Fig. 5

GPS RECEIVER HAVING A RAPID ACQUISITION OF GPS SATELLITE SIGNALS

CROSS REFERENCE TO RELATED APPLICATION

This application is related to an application of Chung Y. Lau et al. Ser. No. 8-276886, filed Jul. 18, 1994 assigned to the same assignee as the present application.

BACKGROUND OF THE INVENTION

1. Field of the Invention

The invention relates generally to Global Positioning System receivers and more particularly to a Global Positioning System receiver having a rapid acquisition of GPS satellite signals.

2. Background of the Invention

A Global Positioning System (GPS) now provides a worldwide, 24 hour, location service. The system includes multiple GPS satellites to broadcast location signals, control stations to monitor and control the satellites, and GPS receivers to receive the signals. Commercial Global Positioning System (GPS) receivers now are used to provide accurate location information in many navigation, tracking, and timing applications. A GPS antenna that is a part of a GPS receiver must have a line of sight to a GPS satellite to receive the GPS signal from that satellite.

GPS location is based on one-way ranging from the GPS satellites to the GPS antenna. Ranges are measured to four satellites simultaneously in view by matching (correlating) the frequency and the time of arrival (TOA) of the incoming GPS signal to a receiver-generated replica signal. With four ranges, the receiver can determine four unknowns, typically latitude, longitude, altitude, and an adjustment to the replica. The ranges are called "pseudoranges" because the actual distances to the GPS satellite are not known until the internal replica has been adjusted. Time of day is computed from the adjustment to the TOA of the replica.

Each GPS satellite broadcasts its position in a signal having a carrier frequency at approximately 1.575 GHz. The signal is modulated by a PRN code sequence of 1023 chips, repeating (arriving) at a 1 millisecond time interval, where each satellite uses a different PRN code sequence. The use of the different PRN sequences enables a GPS receiver to distinguish the GPS signals from different GPS satellites. The frequency of the signal received from each GPS satellite will have a Doppler shift due to the relative velocity between the GPS satellite and a GPS antenna. A velocity for the GPS antenna may be determined from the rate of change of the location or from the rate of change of the pseudoranges after accounting for the Doppler shift due to the motion of the satellite.

Power consumption is an important figure of merit for a GPS receiver. A low power consumption is good for a GPS receiver that depends upon a battery for a power source. To achieve low power, some GPS receivers have a low power standby mode, where power consumption is reduced but the GPS signals are not tracked. Some GPS receivers have a system to alternate between a normal mode to obtain a location fix and the low power standby mode.

Another important figure of merit for a GPS receiver is the time required to obtain a location fix or the "acquisition time." A fast acquisition is good because a user does not need to wait as long for a new location fix. In GPS receivers that automatically cycle to power off or to the standby mode between location fixes, a fast acquisition time is good because less time is used in the normal mode to acquire the GPS signal, resulting in a lower average power consumption.

Three acquisition times are often quoted. A "time to first fix," sometimes called a "cold start" acquisition, refers to the time to acquire the GPS satellite signal and obtain a location fix when the GPS receiver has not had a location fix within the previous few hours. A "signal interruption" acquisition time refers to the time to reacquire the GPS satellite signal and to obtain a location fix after the line of sight to the GPS satellite signal has been blocked and then unblocked. A "time to subsequent acquisition," sometimes called a "warm start" acquisition, refers to the time to reacquire the GPS satellite signal and obtain a location fix, when the GPS receiver has had a location fix within the previous few hours.

The subsequent acquisition is fast when the initial replica frequency is within 500 Hertz (0.3 parts per million) of the GPS frequency and the initial replica TOA is within 500 μs of the GPS TOA. Typically, the greater the differences between the initial replica frequency and the GPS frequency and between the initial replica TOA and the GPS TOA, the greater the time required to acquire the GPS signal.

Some GPS receivers reduce the difference between the initial replica frequency and the GPS frequency by synchronizing the replica frequency to a reference oscillator that continues to operate during a standby time duration. However, a change in temperature inside the receiver, because less heat is being generated during the standby mode or/and because the outside temperature changes, will probably cause the reference oscillator frequency to drift, thereby causing the replica frequency to drift. An inexpensive XO reference oscillator, using a crystal as a resonator, provides a frequency stability of approximately 5 to 50 parts per million (ppm) within a temperature range of −40° C. to +85° C. A problem with an XO is that a change in temperature of 1° C. or less typically causes a change in frequency of more than 0.3 ppm. A temperature compensated crystal oscillator (TCXO) may be used to improve the stability to approximately 0.5 to 5 ppm within −40° C. to +85° C. but still may not be stable enough to provide 0.3 ppm during a typical standby time duration. A further problem with a TCXO is that the incremental cost of a TCXO over an XO is a significant part of the cost of an entire GPS receiver. A temperature stabilized oven, enclosing the reference oscillator, further improves the frequency stability but the oven would have to remain on, requiring a large power consumption during the standby mode in order to provide the improvement. A further problem is that an oven stabilized oscillator may cost as much or more than an entire GPS receiver.

What is needed is a GPS receiver having a rapid acquisition of GPS satellite signals, after a time duration in a low power standby mode, using a reference oscillator having a frequency variation of up to 50 ppm over the range of −40° C. to +85° C.

SUMMARY OF THE PRESENT INVENTION

It is therefore an object of the present invention to provide a GPS receiver having a rapid acquisition of GPS satellite signals following a time duration in a low power standby mode, using an internal GPS replica signal that is derived from a reference oscillator having a frequency variation of up to 50 ppm.

Another object is to provide a GPS receiver where a time of arrival (TOA) of a PRN code of the GPS replica signal is derived from a reference timer that retains synchronization to the reference oscillator during the standby mode.

Another object is to provide a GPS receiver using a learned frequency correction to compensate for drift in the reference frequency that occurs during the standby time duration by correcting an initial frequency adjustment of the replica signal used to initiate the acquisition of the GPS signal following the standby time duration.

Another object is to provide a GPS receiver using a learned TOA correction to compensate for drift in the reference TOA that occurs during the standby time duration by correcting an initial reference TOA adjustment used to initiate the acquisition of the GPS signal following the standby time duration.

Another object is to provide a GPS receiver using a frequency correction, based upon a temperature of the reference oscillator and a frequency/temperature relationship for the reference oscillator, to compensate for drift in the reference frequency that occurs during the standby time duration by correcting the initial frequency adjustment of the replica signal used to initiate the acquisition of the GPS signal following the standby time duration.

Another object is to provide a GPS receiver using a TOA correction, based upon an elapsed time in the standby time duration and a TOA/temperature relationship, to compensate for drift in the reference TOA that occurs during the standby time duration by correcting the initial TOA adjustment used to initiate the acquisition of the GPS signal following the standby time duration.

Briefly, the preferred embodiment of the present invention is a GPS receiver, having normal mode where GPS satellite signals are acquired and tracked and GPS location information is provided, having a low power standby mode where GPS satellite signals are not tracked, and having a rapid subsequent acquisition of GPS satellite signals when the GPS receiver enters the normal mode after a time duration in the standby mode. In the normal mode, an RF section receives a GPS satellite signal and provides an IF signal to a correlation section to provide a correlation signal to a microprocessor section for calculating a GPS location from information included in the GPS satellite signal. In the standby mode, the operation is inhibited and the power consumption is substantially eliminated in the RF section, the correlator section, and the microprocessor section. A reference oscillator and a timer continue to provide a reference frequency and a reference time of arrival (TOA) during the low power standby mode. The GPS receiver acquires the GPS signal by adjusting a replica signal, based upon the reference frequency and the reference TOA, to correlate to the GPS signal. The acquisition is fast when the initial adjustment to the replica provides correlation with no or few additional adjustment cycles. Two preferred embodiments are disclosed to correct the replica signal for drift in the reference frequency and in the reference TOA during the standby mode. In a first embodiment, a selected time duration in the normal mode alternates with a selected time duration in the standby mode. The reference frequency drift and the reference TOA drift are learned and used to correct the initial adjustment following the next standby mode. In a second embodiment, a temperature sensor measures a temperature during a last location fix before entering the standby mode and measures a temperature when the GPS receiver re-enters the normal mode. A frequency/temperature relationship and a TOA temperature relationship are pre-determined and stored in memory. A reference frequency drift correction and a reference TOA drift correction are calculated from the relationships and used to correct the initial adjustment following a standby mode.

An advantage of the present invention is that the GPS receiver uses a reference oscillator having a frequency variation of up to 50 ppm to have a rapid subsequent acquisition of GPS satellite when the GPS receiver turns on following a time duration in the standby mode.

Another advantage is that the GPS receiver uses a timer that retains synchronization to the reference oscillator during the standby time duration.

Another advantage is that the GPS receiver learns a frequency correction to correct for drift that occurs in the reference frequency during the standby time duration.

Another advantage is that the GPS receiver learns a TOA correction to correct for drift that occurs in the reference TOA during the standby time duration.

Another advantage is that the GPS receiver uses the temperature of the reference oscillator and a stored frequency/temperature relationship to correct for drift that occurs in the reference frequency during the standby time duration.

Another advantage is that the GPS receiver uses an elapsed time in the standby mode and a stored TOA/temperature relationship to correct for drift that occurs in the reference TOA during the standby time duration.

These and other objects and advantages of the present invention will no doubt become obvious to those skilled in the art after having read the following detailed description of the preferred embodiment.

IN THE DRAWINGS

FIG. 5 is a table for the frequency/temperature relationship of FIG. 2.

DETAILED DESCRIPTION OF THE INVENTION

Figure 1A:
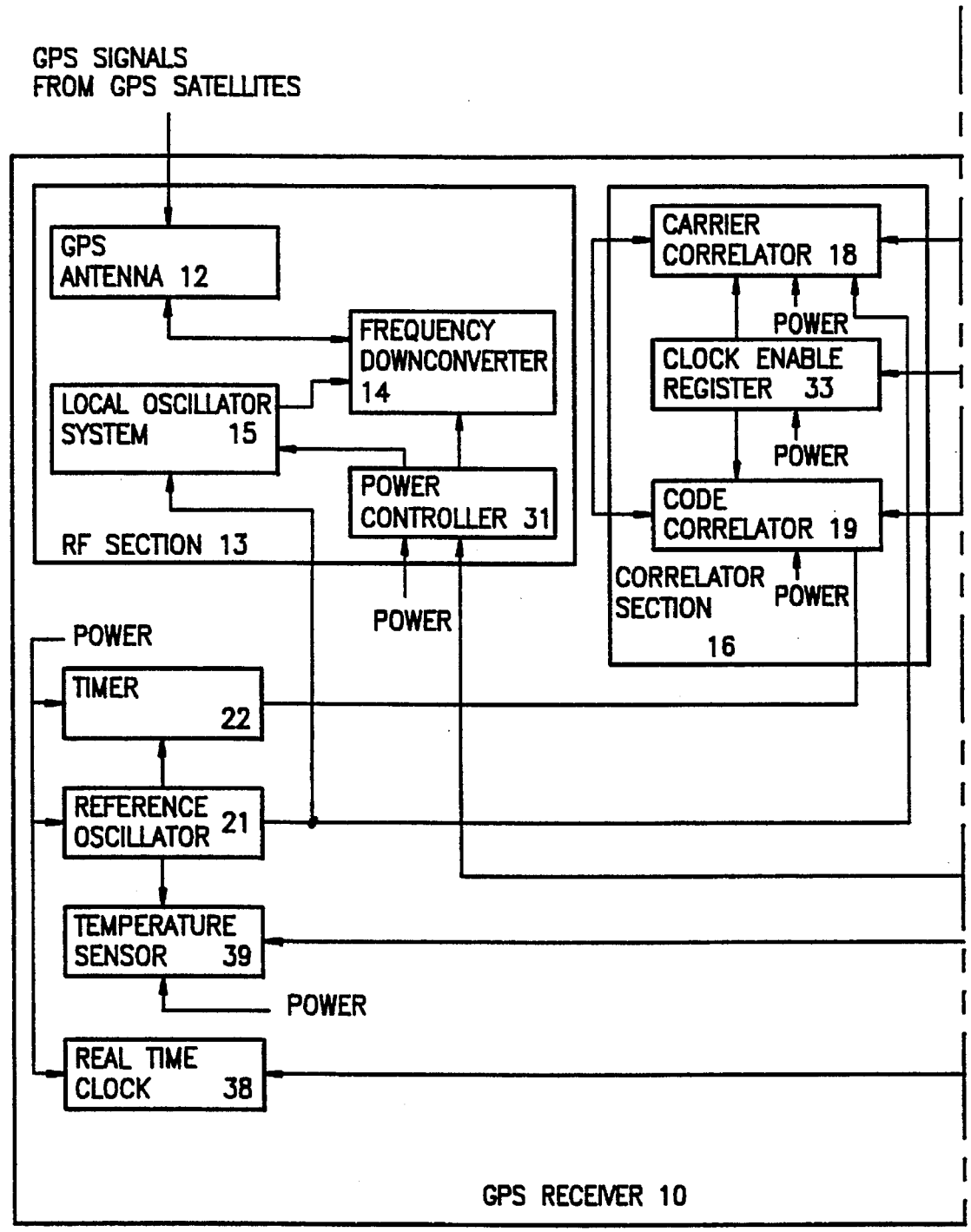
FIGS. 1A and 1B are a block diagram of a GPS receiver having a rapid subsequent acquisition of GPS satellite signals according to the present invention.
Figure 1B:
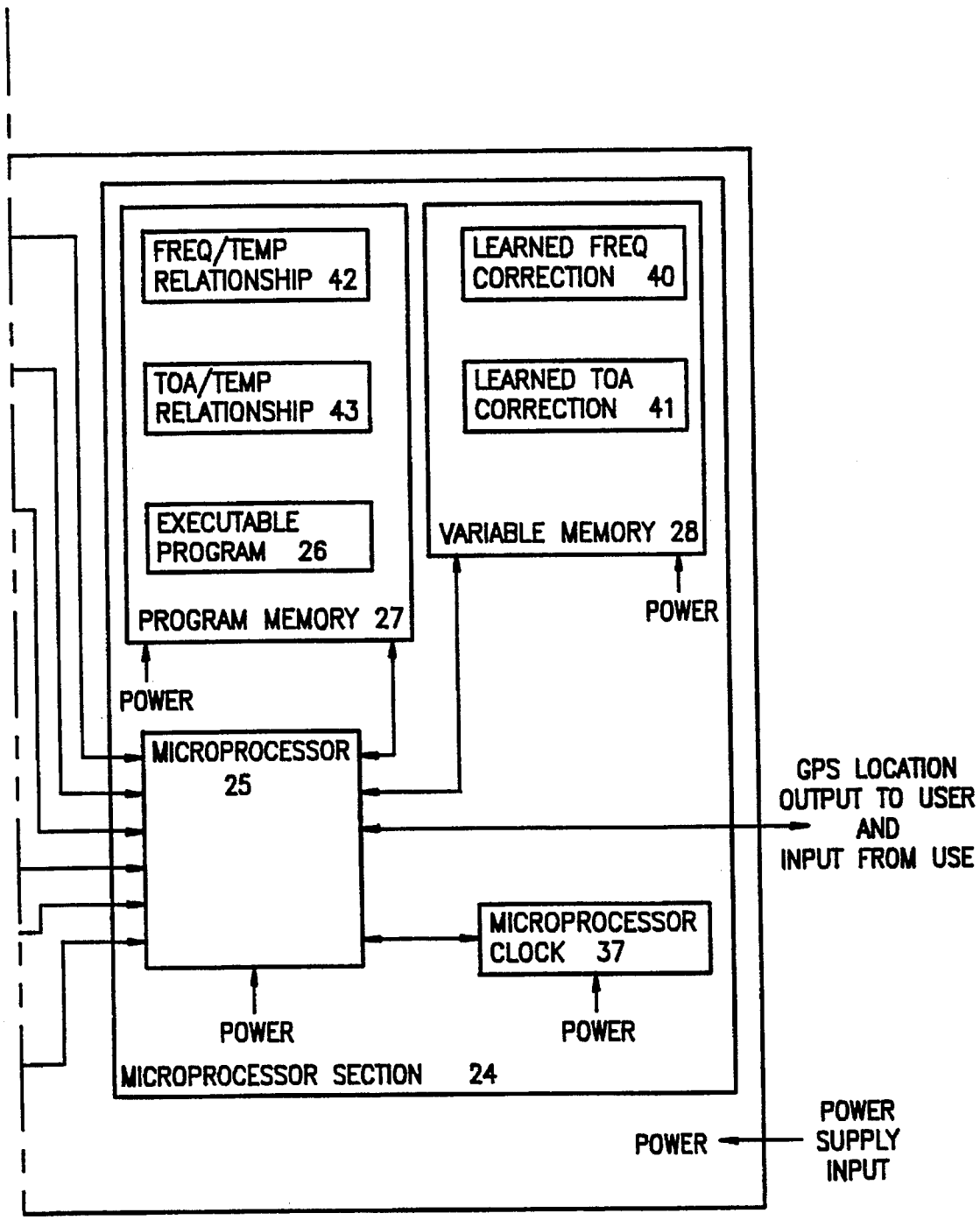
Figure 1B:
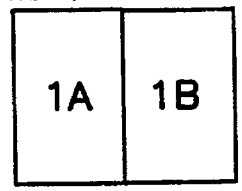

FIG. 1 illustrates a GPS receiver 10 to acquire a GPS satellite signal from one or more GPS satellites and to use information in the GPS signal to provide a location, a time of day, and a directional velocity for the GPS receiver 10. The GPS signal has a carrier frequency of approximately 1.575 GHz modulated by a PRN C/A code sequence repeating at a 1 millisecond time interval. The GPS receiver 10 computes the location and the time of day from the time of arrival (TOA) of the PRN C/A code sequences in the GPS signal as compared to the time of arrival (TOA) of an internally generated PRN C/A code sequence. The PRN C/A code sequence in the GPS signal includes ephemeris information for the location in space of the GPS satellite and almanac information for the approximate locations in space of all the other GPS satellites. Each GPS signal uses a distinct PRN code sequence to enable the GPS receiver 10 to distinguish the GPS signals from each of the GPS satellites. The PRN codes and the format of the C/A information are set forth in is GPS Interface Control Document ICD-GPS-200, published by Rockwell International Division, Revision A, 26 Sep. 1984, which is incorporated by reference herein.

The GPS receiver 10 includes an RF section 13 including a GPS antenna 12 to receive the GPS satellite signal and to issue an antenna output signal, a local oscillator system 15 to provide one or more local oscillator signals, and a frequency downconverter 14 to receive the antenna output signal and to use the local oscillator signal to shift the frequency of the antenna output signal to an intermediate frequency (IF), signal 14. The IF signal has a frequency that represents the frequency of the GPS satellite signal and a TOA that represents the TOA of the PRN C/A code sequence of the GPS satellite signal. A correlator circuit 16, including a carrier correlator 18 and a code correlator 19, receives the IF signal from the frequency downconverter 14. A reference oscillator 21 provides a reference frequency in a signal. The carrier correlator 18 receives the reference frequency signal, adjusts the reference frequency to generate a replica signal frequency, and provides a correlation signal for the correlation between the IF signal frequency and the replica signal frequency. A timer 22 receives the reference frequency signal and provides a reference TOA in a signal. The code correlator 19 receives the reference TOA signal, adjusts the reference TOA to generate a replica signal PRN code TOA, and provides a correlation signal for the correlation between the IF signal PRN code TOA and the replica signal PRN code TOA. The PRN code sequence in the replica signal code is either stored or generated to match the PRN sequence of the GPS satellite to be acquired or tracked. The local oscillator system 15 receives the reference frequency signal in order to provide the local oscillator signal to the frequency downconverter 14.

A microprocessor section 24 receives the carrier correlation signal, calculates the frequency adjustment to obtain the correlation between the replica signal frequency and the IF signal frequency, and provides the adjustment to the carrier correlator 18 in a feedback adjustment signal. The microprocessor section 24 receives the code correlation signal, calculates the TOA adjustment to obtain the correlation between the replica signal code TOA and the IF signal code TOA, and provides the adjustment to the code correlator 19 in a feedback adjustment signal. One or more frequency adjustments are provided in the feedback adjustment signal, where each frequency adjustment corresponds to one of the one or more GPS satellite signals that are to be acquired or are being tracked. One or more TOA adjustments are provided in the feedback adjustment signal, where each TOA adjustment corresponds to one of the one or more GPS satellite signals that are to be acquired or are being tracked. The GPS satellite signal is acquired by adjusting the replica frequency until correlation to the IF signal frequency is obtained and adjusting the replica signal TOA until correlation to the IF signal TOA is obtained. When the GPS satellite signals are being tracked, the replica signal frequency and the replica signal TOA are being continuously adjusted to maintain correlation. The carrier correlation and the code correlation are performed approximately simultaneously.

A pseudorange for the GPS satellite signal is measured from the replica signal code TOA that correlates to the IF signal code TOA. With four pseudorange and the locations in space of the associated GPS satellites, the GPS microprocessor section 24 computes time of day and 3 spatial dimensions of a location, such as: x distance, y distance, and z distance from a reference location point, or a latitude, a longitude, an altitude. Location may be computed with fewer than four pseudoranges if the microprocessor section 24 is given information for an altitude or a precise time of day from an external source. A pseudorange rate is measured from the replica signal frequency that correlates to the IF signal frequency. With four pseudorange rates, the microprocessor section 24 computes a directional velocity. Fewer than four pseudorange rates may be needed if a speed, a direction, or a precise frequency is available from another source.

The microprocessor section 24 includes a microprocessor 25 capable of executing program instructions in an executable program 26. The executable program 26 and pre-determined information are stored in a program memory 27. A variable memory 28 stores variable information. The program memory 27 and the variable memory 28 have the capability of retaining stored instructions and information when the GPS receiver 10 is powered off or in a standby mode. The program memory 27 is an erasable, programmable read only memory (EPROM). Other memory types, including masked ROM, one time programmable (OTP) ROM, flash memory, or battery backed static random access (SRAM), could be used. The variable memory 28 is battery backed up SRAM. Other memory types, including flash memory, could be used. The microprocessor 25 operates in a conventional manner to receive digital signals representing information, to process the information by executing instructions in the executable program 26, and to issue digital signals representing information to control the elements in the microprocessor section 24 and in the GPS receiver 10.

The reference oscillator 21 uses an AT cut crystal resonator to provide the reference frequency such as approximately 16.368 MHz, approximately 10 MHz, or approximately 12.5 MHz. The choice of reference frequency is not critical to the present invention. The timer 22 generates the reference TOA signal by counting a pre-determined number of cycles of the reference frequency signal received from the reference oscillator 21 to cause the time interval of the reference TOA signal to approximately match the time interval of the GPS signal code of 1 millisecond.

The GPS receiver 10 has a fully powered, normal mode where the GPS satellite signals are acquired and tracked and GPS location information is provided, and a low power standby mode, where the GPS satellite signals are not tracked. In the standby mode, the operation is inhibited and the power consumption is reduced in the RF section 13, the correlator section 16, and the microprocessor section 24. The modes of each of the RF section 13, the correlator section 16, and the microprocessor section 24 are separately controllable by the microprocessor section 24.

An internal or an external power supply provides power for the GPS receiver 10. The mode of the RF section 13 is controlled by a power controller 31 to control the flow of power to the RF section 13. In the standby mode, the microprocessor section 24 executes program instructions in the executable program 26 to control the power controller 31 to inhibit the flow of power to the RF section 13 in the low power standby mode and to pass power to the RF section 13 in the normal mode.

The mode of the correlator section 16 and the mode of the microprocessor section 24 are controlled by inhibiting the respective clock signals driving those sections. The circuits in the correlator section 16 and the microprocessor section 24 are designed with Complementary Metal Oxide Silicon (CMOS) that operate synchronously with a clock signal. These circuits consume power primarily when changing digital states. When the CMOS circuits do not receive a clock signal, the digital states of the circuits are retained and the power consumed in the circuits is reduced by at least an order of magnitude. A correlator clock enable register 33 controls the flow of the clock signal to the correlator section 16. The microprocessor section 24 executes program instructions in the executable program 26 to control the correlator clock enable register 33 to inhibit the flow of the clock signal in the correlator section 16 in the low power standby mode and to pass the clock signal to the correlator section 16 in the normal mode.

The microprocessor section 24 includes a microprocessor clock 37 to provide a microprocessor clock signal. Alternatively, the microprocessor clock signal is provided by another source. The microprocessor 25 in the preferred embodiment is a static microprocessor of the CPU32 family manufactured by Motorola having a capability of executing an "LPstop" to inhibit the microprocessor clock 37 or/and a clock signal received from another source and including an interrupt capability to cause it to pass the clock signal upon the receipt of a wakeup interrupt signal. The microprocessor section 24 executes LPstop in the executable program 26 to inhibit the clock signal to enter the low power standby mode and receives the wakeup interrupt signal to re-enter the normal mode.

A real time clock 38, including an RTC clock source, provides the wakeup interrupt signal to the microprocessor section 24 at the completion of a selected standby time duration. The microprocessor section 24 selects the time duration and initializes the real time clock 38 with a digital control signal. The real time clock 38 also provides time of day information to the microprocessor section 24 in a time signal. The microprocessor section 24 uses the time of day information in the estimation of the locations in space of the GPS satellites in order to estimate the initial frequency adjustment and the initial TOA adjustment used for the subsequent acquisition.

When the GPS receiver 10 enters the normal mode after a time duration in the standby mode, the microprocessor section 24 executes instructions in the executable program 26 to estimate new adjustments to the replica frequency and to the replica TOA, based upon the new time and upon the new locations of GPS satellites and of the GPS receiver 10, for the subsequent acquisition of the GPS satellite signal. The adjustments are provided to the carrier correlator 18 and to the code correlator 19 for the initial frequency and initial TOA of the replica for the searches for the GPS IF frequency and for the GPS IF TOA, respectively. Subsequent acquisition occurs most rapidly where the frequency and the TOA of the initial replica most closely approximate the frequency and the TOA of the GPS IF signal, respectively. When the frequency of the replica matches the frequency of the GPS signal to within approximately 500 Hertz referred to the GPS carrier frequency (0.3 ppm), and the TOA of the replica matches the TOA of the GPS signal to within approximately 500 us, the acquisition time is fast because no or few additional adjustments are required to obtain correlation. The reference oscillator 21, the timer 22, and the real time clock 38 receive power and continue to operate during the low power standby mode in order to provide the reference frequency, the reference TOA, and the time of day for use in subsequent acquisition.

A means for controlling the mode of the GPS receiver 10 includes the power controller 31 to control the flow of power to the RF section 13, the correlator clock enable register 33 to control the flow of clock to the correlator circuit 16, the real time clock 38 to provide elapsed time information and to provide a wakeup interrupt, the executable program 26 to retain program instructions for the LPstop and the selection of the mode, and the microprocessor 25 to receive the wakeup interrupt, and to execute the program instructions to control the power controller 31, the correlator clock enable register 33, the microprocessor clock 37, and the real time clock 38.

The circuits in the GPS receiver 10 are housed in a package. The temperature inside the package can change due to a change in the temperature outside of the package or due to a change in a temperature difference between the inside and the outside of the housing. Typically, the temperature inside the GPS receiver 10 decreases during the time duration in the low power standby mode because less heat is generated by the few circuits operating during the standby mode than by all the circuits operating during the normal mode. When the GPS receiver 10 is tracking the GPS signal, the replica frequency and the replica TOA are continuously adjusted by the microprocessor section 24 to correlate to the IF signal, thereby correcting for a reference frequency drift due to a change in temperature. During the time duration when the GPS receiver 10 is in the standby mode the reference frequency probably drifts causing the initial replica frequency and causing the initial replica TOA used in the subsequent acquisition to have an error relative to the IF frequency and TOA, respectively.

Figure 3:
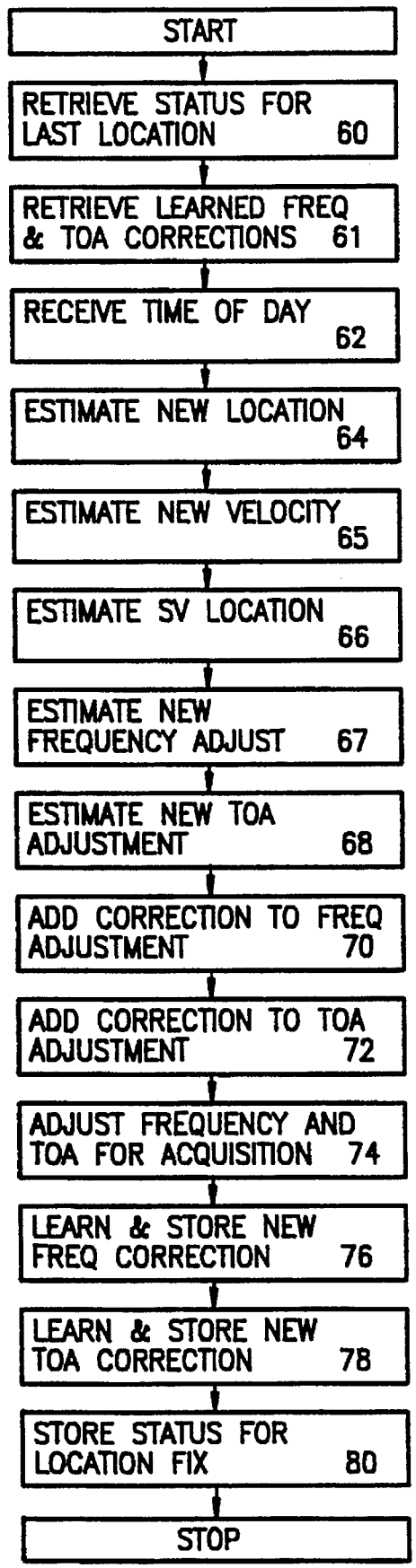
FIG. 3 is a flow chart diagram of a method using learned corrections for the subsequent acquisition of the GPS satellite signals by the GPS receiver of FIG. 1.

In a first preferred embodiment, the microprocessor 25 executes the executable program 26 to cause the GPS receiver 10 to alternate between a selected time duration in the normal mode and a selected time duration in the standby mode. The selected time durations are pre-determined, based upon the intended application, or determined by a user of the GPS receiver 10 and passed to the microprocessor section 24 in a user input signal. Because the time durations are repeated, a frequency correction that compensates the drift is approximately the same for each subsequent acquisition. The frequency correction is stored in the variable memory 28 as a learned frequency correction 40. Similarly, a TOA correction that compensates for the drift is approximately the same for each subsequent acquisition. The TOA correction is stored in the variable memory 28 as a learned TOA correction 41. When the GPS receiver 10 re-enters the normal mode after a time duration in the standby mode, the executable program 26 uses the learned frequency correction 40 and the learned TOA correction 41 to correct the initial frequency adjustment and the initial TOA adjustment, respectively, provided to the correlator section 16. FIG. 3 describes the steps in a method, whereby the GPS receiver 10 has a rapid acquisition of the GPS signal according to the first embodiment.

Figure 4:
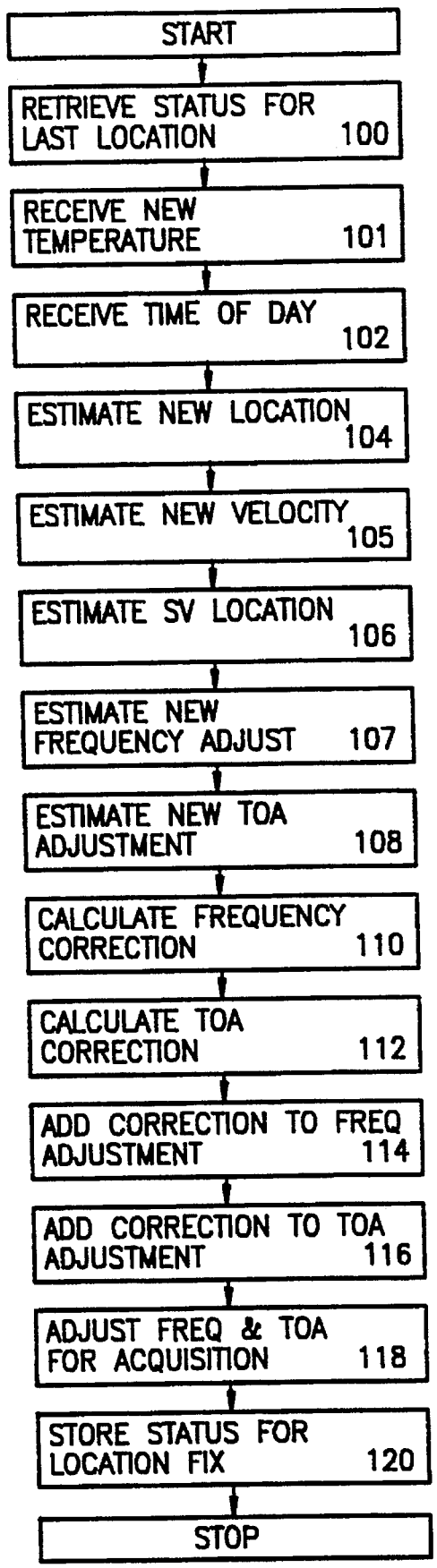
FIG. 4 is a flow chart diagram of a method using the frequency/temperature relationship of FIG. 2 for the subsequent acquisition of the GPS satellite signals by the GPS receiver of FIG. 1.

In a second preferred embodiment, the GPS receiver 10 includes a temperature sensor 39 to provide a temperature signal having information for the temperature of the reference oscillator 21 inside the package of the GPS receiver 10. A frequency/temperature relationship 42 is pre-determined in design and included in the program memory 27. Optionally, the frequency/temperature relationship 42 may be pre-determined for each unit by testing. Testing each unit gives a more accurate relationship but is more expensive in manufacturing. The microprocessor 25 executes the executable program 26 to apply the temperature information to the frequency/temperature relationship 42 to estimate the frequency correction required to compensate for the drift caused by a change in temperature that occurred during the standby time duration. Similarly, a TOA/temperature relationship 43 is pre-determined in design and included in is the program memory 27. Optionally, the TOA/temperature relationship 43 may be pre-determined for each unit by testing. Testing each unit gives a more accurate relationship but is more expensive in manufacturing. The microprocessor 25 executes the executable program 26 to apply the frequency correction, the elapsed time between a time of day of a last location fix and a time of day of a subsequent acquisition to the TOA/temperature relationship 43 to estimate the TOA correction required to compensate for the drift caused by a change in temperature that occurred during the standby time duration. FIG. 4 describes the steps in a method, whereby the GPS receiver 10 has a rapid acquisition of the GPS receiver 10 according to the second embodiment.

Figure 2:
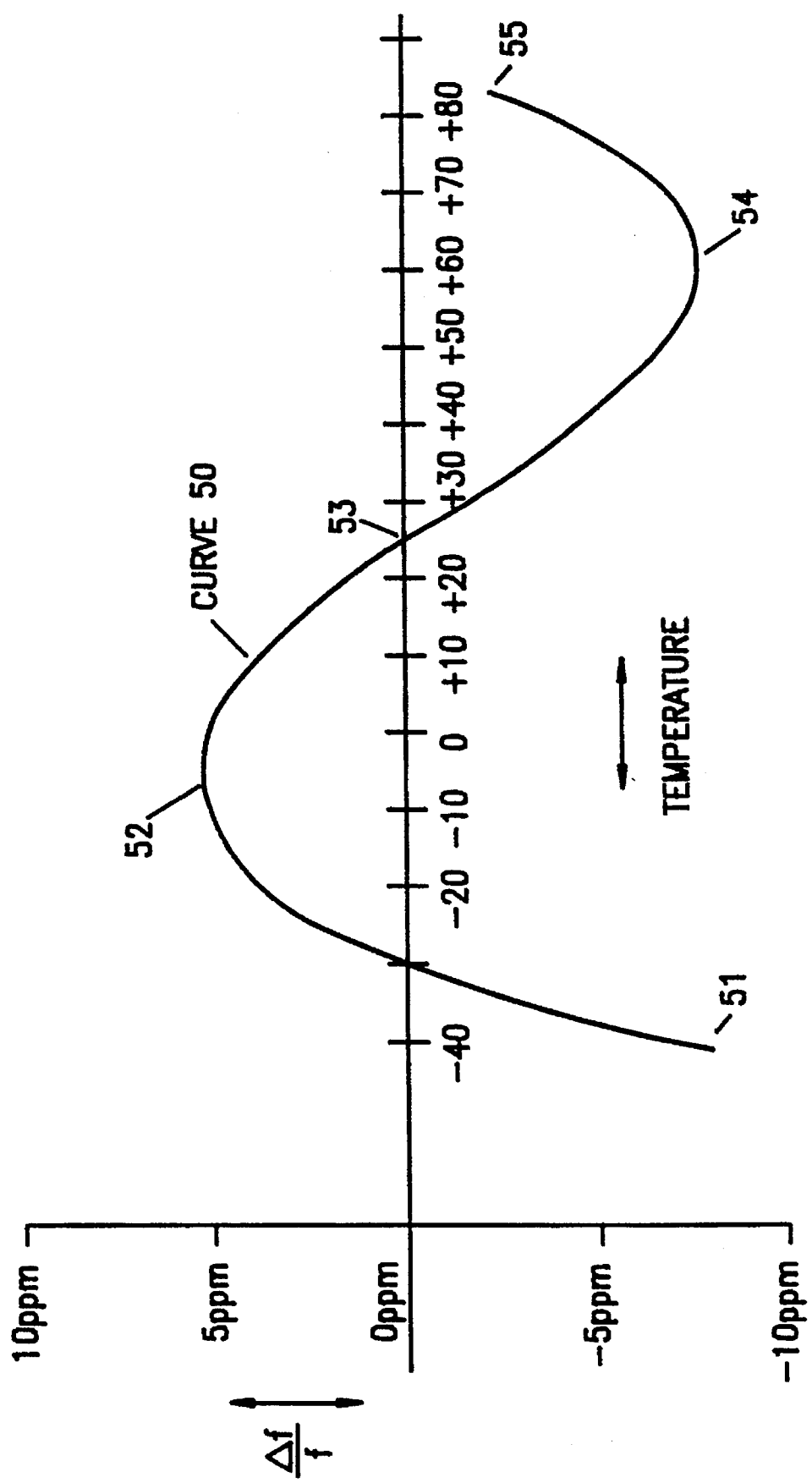
FIG. 2 is a curve of the frequency/temperature relationship of the reference frequency in the GPS receiver in FIG. 1.

FIG. 2 illustrates a curve 50 for the frequency/temperature relationship 42 between the reference frequency and the temperature of the reference oscillator 21. The vertical axis shows variation in the reference frequency divided by the nominal frequency, $\Delta f/f$, in units of parts per million (ppm). The horizontal axis shows temperature in degrees Centigrade (°C.). The curve 50 shows a frequency/temperature relationship 42 having a lower minimum point 51 at approximately $-40°$ C., $-7.5$ ppm, a lower maximum point 52 at approximately $-8°$ C., $+6.1$ ppm, a mid point 53 at approximately $+24°$ C., 0 ppm, an upper minimum point 54 at approximately $+61°$ C., $-7.9$ ppm, and an upper maximum point 55 at approximately $+85°$ C., $-1.6$ ppm. A reference oscillator 21 may have a minimum and a maximum slightly smaller than shown in curve 50 or, using a less expensive crystal resonator, may have a minimum or/and a maximum up to plus or minus 50 ppm.

FIG. 3 illustrates a flow chart of the steps in a method for a rapid time to subsequent acquisition according to the first preferred embodiment of the invention. The steps in the method are implemented by the microprocessor section 24 by executing program instructions in the executable program 26 stored in the program memory 27. The GPS receiver 10 altimeters between a selected time duration in the normal mode and a selected time duration in the low power standby mode. Defaults for the selected time durations are pre-determined and stored in the program memory 27 based upon the intended application of the GPS receiver 10. A user can modify the selected time durations and cause the modified times durations to be stored in the variable memory 28. Typically, a location fix is obtained during the normal mode. The GPS receiver 10 stores status information associated with a last location fix in the variable memory 28 including: (i) the spatial location coordinates of the GPS antenna 12, (ii) the directional velocity of the GPS antenna 12, (iii) the time of day, (iv) the ephemeris or/and almanac location information for the GPS satellite being tracked, (v) the learned frequency correction 40, is and (vi) the learned TOA correction 41. The calculations of the spatial location and the directional velocity use a coordinate system such as latitude, longitude, and altitude, or x, y, and z distances from a reference location point, to describe geographical locations in the vicinity of the surface of the Earth. When the GPS receiver 10 calculates location and velocity using x, y, and z coordinates, the coordinates are typically converted to another system, such as latitude, longitude, and altitude for display to a human user. FIG. 3 starts when the GPS receiver 10 re-enters the normal mode and begins the subsequent acquisition of the GPS satellite signals.

Step 60 retrieves the status information associated with the last location fix. Step 61 retrieves the learned frequency correction 40 and the learned TOA correction 41. Step 62 receives a new time of day provided from the real time clock 38. Step 64 uses equations 1, 2, and 3 to estimate a new location for the GPS antenna 12 based upon the last location, upon the last directional velocity, and upon the elapsed time between the new time and the last time. Equation 1 solves for a new estimated location in the x dimension, $x_e$, from the last location in the x dimension, $x_l$, and from the last velocity in the x direction, $(dx/dt)_l$, multiplied by the elapsed time, $\Delta t$, from the last time to the next time. Similarly, equations 2 and 3 solve for new estimated locations in the y dimension and the z dimension.

$$x_e = x_l + (dx/dt)_l \Delta t \quad (1)$$

$$y_e = y_l + (dy/dt)_l \Delta t \quad (2)$$

$$z_e = z_l + (dz/dt)_l \Delta t \quad (3)$$

where $x_e$ is the estimate of the new location in the x dimension $y_e$ is the estimate of the new location in the y dimension $z_e$ is the estimate of the new location in the z dimension $x_l$ is the last location in the x dimension $y_l$ is the last location in the y dimension $z_l$ is the last location in the z dimension $(dx/dt)_l$ is the last velocity in the x direction $(dy/dt)_l$ is the last velocity in the y direction $(dz/dt)_l$ is the last velocity in the z direction $\Delta t$ is the elapsed time Optionally, step 64 may include only a part or none of the last velocity in the estimation of the new location. Step 65 estimates the new velocity to be the last velocity. Optionally, step 65 may include only a part or none of the last velocity in the estimate of the new is velocity. Step 66 estimates a new location in space for the GPS satellite based upon the ephemeris or/and the almanac information and the new time of day. Step 67 estimates the replica frequency adjustment, accounting for the relative Doppler shift between the GPS satellite and the GPS antenna 12, based upon the new time, the estimated new location, the estimated new directional velocity, the estimated location in space of the GPS satellite, and the equations for the GPS satellite orbital parameters. Step 68 estimates the initial TOA adjustment, based upon the estimated new location, the estimated location in space of the GPS satellite, and the equations for the GPS satellite orbital parameters. Step 70 corrects the initial replica frequency adjustment by adding the learned frequency correction 40 to the adjustment and provides the corrected initial frequency adjustment to the carrier correlator 18. Step 72 corrects the initial replica TOA adjustment by adding the learned TOA correction 41 to the initial adjustment and provides the corrected initial TOA adjustment to the code correlator 19. A user is given the capability of interrupting the standby mode before the standby time duration is completed. When the standby mode is interrupted, the steps 70 and 72 correct the initial replica frequency adjustment and correct the initial replica TOA adjustment, respectively, by the portion of the learned frequency correction 40 equivalent to the portion of the originally selected standby time duration that was completed before the interruption. In step 74 the initial replica frequency and the replica TOA are adjusted to acquire the GPS signal by obtaining correlation. In step 76 the difference between the corrected initial frequency adjustment provided in step 70 and the frequency adjustment that resulted in correlation is used to calculate a new learned frequency correction 40 according to equation 4. Equation 4 uses a weighting factor, $k_f$, to merge the actual frequency correction, $C_{fa}$, and into the existing learned frequency correction $LFC_e$, to obtain the new learned frequency correction $LFC_n$. The new learned frequency correction, $LFC_n$ is stored in the variable memory 28 as the learned frequency correction 40. In step 78, the difference between the corrected initial TOA adjustment provided in step 72 and the TOA adjustment that resulted in correlation is used to calculate a new learned TOA correction $LFC_n$ according to equation 5. Equation 5 uses a weighting factor, $k_t$, to merge the actual TOA correction, $C_{ta}$, and into the existing learned TOA correction $LTC_e$, to obtain the new learned TOA correction $LTC_n$. The new learned TOA correction $LTC_n$ is stored in the variable memory 28 as the learned TOA correction 41.

$$LFC_n = k_f * C_{fa} + (1-k_f) * LFC_e \qquad (4)$$

$$LTC_n = k_t * C_{ta} + (1-k_t) * LTC_e \qquad (5)$$

where $LFC_n$ is the new learned frequency correction $C_{fa}$ is the actual frequency correction to obtain correlation $LFC_e$ is the existing learned frequency correction $LTC_n$ is the new learned TOA correction $C_{ta}$ is the actual TOA correction to obtain correlation $LTC_e$ is the existing learned TOA correction $k_f$ is a selected frequency weighting factor, $0 < k_f \leq 1$ $k_t$ is a selected TOA weighting factor, $0 < k_t \leq 1$ The weighting factors, $k_f$ and $k_t$ are selected at 0.1. Any weighting factor greater than 0 and less than or equal to 1 will improve the speed of the acquisition. A weighting factor of 0 has no learning. A weighting factor of 1 has no memory. Step 80 stores the status information associated with the location fix. If no location is obtained after the selected time duration for the normal mode, the existing learned correction information and the existing status information is retained and the GPS receiver 10 goes into the standby mode.

FIG. 4 illustrates a flow chart of the steps in a method for a rapid time to subsequent acquisition according to the second preferred embodiment of the invention. The GPS receiver 10 stores status information associated with a location fix in the variable memory 28 including: (i) the spatial location coordinates of the GPS antenna 12, (ii) the directional velocity of the GPS antenna 12, (iii) the time of day, (iv) the ephemeris or/and almanac location information for the GPS satellite being tracked, (v) the reference frequency adjustment, (vi) the reference TOA adjustment, and (vii) the temperature of the reference oscillator 21. The calculations of the spatial location and of the directional velocity use a coordinate system such as latitude, longitude, and altitude, or x, y, and z distances from a reference location point, to describe a geographical location in the vicinity of the surface of the Earth. When the GPS receiver 10 calculates the location and the velocity using x, y, and z coordinates, the coordinates are typically converted to another system, such as latitude, longitude, and altitude for display to a human user. The steps in the method are implemented by the microprocessor section 24 by executing program instructions in the executable program 26 stored in the program memory 27. FIG. 4 starts when the GPS receiver 10 re-enters the normal mode and begins the subsequent acquisition of the GPS satellite signals.

Step 100 retrieves the status information associated with the last location fix. Step 101 receives a new temperature from the temperature sensor 39. Step 102 receives a new is time of day from the real time clock 38. Step 104 estimates a new location for the GPS antenna 12 based upon the last location, upon the last directional velocity, and upon the elapsed time between the new time and the last time according to the equations in x distance, y distance, and z distance from a reference location point according to equations 1, 2, and 3. Optionally, step 104 may include only a part or none of the last velocity in the estimation of the new location. Step 105 estimates the new velocity to be the last velocity. Optionally, step 105 may include only a part or none of the last velocity in the estimate of the new velocity. Step 106 estimates a new location in space for the GPS satellite based upon the ephemeris or/and almanac information and upon the new time. Step 107 estimates the initial replica frequency adjustment, based upon the last frequency adjustment and upon the relative Doppler shift between the GPS satellite and the GPS antenna. The relative Doppler shift is calculated from the estimated new location of the GPS antenna 12, the estimated new directional velocity of the GPS antenna 12, the estimated location in space of the GPS satellite, and the equations for the GPS satellite orbital parameters. Step 108 estimates the replica TOA adjustment, based upon the last TOA adjustment and upon the range to the GPS satellite. The relative range is calculated from the estimated new location of the GPS antenna 12, the estimated location in space of the GPS satellite, and the equations for the GPS satellite orbital parameters.

Step 110 estimates a frequency correction, based upon the last temperature retrieved in step 100, the new temperature received in step 101, and the frequency/temperature relationship 42. The information in the relationship 42 can be stored in a table, in coefficients of an equation, or both in a table and in coefficients. The coefficients may be calculated from the table using linear algebra or the table may be calculated from the coefficients by solving algebraic equations. Either the table or the coefficients can be used to calculate the frequency variation. FIG. 5 illustrates the table for the pre-determined frequency/temperature relationship 42. The table in FIG. 5 shows a temperature in degrees Centigrade and the variation in the reference frequency in parts per million (ppm) associated with the temperature. To calculate a frequency variation using the table, a table lookup procedure finds the last frequency variation associated with the last temperature, finds the new frequency variation associated with the new temperature, and subtracts the last frequency variation from the new frequency variation. The resulting frequency variation in ppm is multiplied by the nominal frequency of the GPS signal. The frequency correction to the frequency adjustment to the replica signal frequency is the negative of the frequency variation. As an example using the table 1, assume the last temperature was 30° C. and the new temperature is 25° C. The last frequency variation is −1.8 ppm, the new frequency variation is −0.3 ppm, so the difference is 1.5 ppm. Linear interpolation is used when a measured temperature is not identical to a temperature included in the table. Multiplying 1.5 ppm by the GPS frequency of 1.575 GHz gives a frequency variation of approximately 2400 Hertz. The frequency correction is the negative of the variation or −1.5 ppm and −2400 Hertz referred to the GPS frequency.

Equation 6 illustrates a fifth order equation to approximate the frequency/temperature relationship 42.

$$\Delta f/f_e = a_0 + a_1 + a_2 T^2 + a_3 T^3 + a_4 T^4 + a_5 T^5 \qquad (6)$$

where:

T is the temperature $\Delta f/f_e$ is the variation in the reference frequency in ppm $a_0$, $a_1$, $a_2$, $a_3$, $a_4$, $a_5$ are the coefficients of the frequency/temperature relationship The coefficients $a_0$, $a_1$, $a_2$, $a_3$, $a_4$, and $a_5$ are determined in design or manufacturing by measuring a frequency error at six temperatures and solving the resulting matrix of six linear equations. The coefficients $a_0=5.70E0$, $a_1=-1.02E-1$, $a_2=-7.81E-3$, $a_3=8.82E-5$, $a_4=2.49E-7$, and $a_5=-2.12E-9$ give a satisfactory agreement of 0.1 ppm over any 5 degree Centigrade increment to the frequency/temperature relationship 42 illustrated in the table in FIG. 5. Closer agreement could be obtained by using more than six power terms in for equation 6. To calculate a frequency variation using the coefficients, equation 6 is solved for a last frequency variation at the last temperature and a new frequency variation at the new temperature. The last frequency variation is subtracted from the new frequency variation and multiplied by the nominal frequency as in the example above. The frequency correction is the negative of the variation.

Step 112 estimates the TOA correction, based upon the frequency correction from step 110, upon an elapsed time calculated from the last time retrieved in step 100, the new time received in step 102, and the TOA/frequency relationship 43. Equation 7 illustrates a first order equation for the TOA/temperature relationship 43.

$$\Delta TOA = k_1 * \Delta f/f_e * \Delta t \quad (7)$$

where $\Delta TOA$ is the time of arrival (TOA) variation in microseconds $\Delta f/f_e$ is the frequency correction in the reference frequency in ppm $\Delta t$ is the time elapsed between the last time and the new time.

$k_1$ is the coefficient of the TOA/temperature relationship

The coefficient $k_1$ has been pre-determined to be approximately 0.5. Step 112 calculates an estimation of the TOA variation by solving for $\Delta TOA$. As an example, assume a frequency correction of 5.0 ppm and an elapsed time of 300 seconds. Using the equation 7, the TOA correction is +750 us.

Step 114 corrects the initial replica frequency adjustment from step 107 by adding the frequency correction estimated in step 110 and provides the corrected adjustment in the initial frequency adjustment to the carrier correlator 18. Step 116 corrects the initial replica TOA adjustment from step 108 by adding the TOA correction estimated in step 112 and provides the corrected adjustment in the initial TOA adjustment to the code correlator 19. In step 118 the frequency adjustment and the TOA adjustment are adjusted until correlation to the GPS signal is obtained. Step 120 stores the status information to be retrieved in step 100.

Although the invention has been described in terms of the presently preferred embodiments, it is to be understood that such disclosure is not to be interpreted as limiting. Various embodiments and modifications will no doubt be apparent to those skilled in the art. Accordingly, it is intended that the appended claims be interpreted as covering alterations and modifications as fall within the true spirit and scope of the invention.

We claim:

1. A GPS receiver having a normal mode to acquire a GPS signal from one or more GPS satellites and to provide a location of the receiver, having a low power standby mode, and having a rapid acquisition of the GPS signal when the receiver enters the normal mode after a time duration in the standby mode, the receiver including:

a means for controlling the mode of the GPS receiver for the normal mode and for the standby mode;

a reference oscillator to generate a continuous reference frequency signal in the normal mode and in the standby mode;

a timer to receive the reference frequency signal and to generate a continuous reference time of arrival (TOA) signal in the normal mode and in the standby mode;

a correlator section to receive the reference frequency signal; to receive the reference TOA signal; to generate a replica signal having a replica frequency based upon the reference frequency signal and having a replica TOA based upon the reference TOA signal; to receive an initial adjustment signal, including an initial frequency adjustment and an initial TOA adjustment when the receiver enters the normal mode after a time duration in the standby mode; to adjust the replica frequency according to the initial frequency adjustment; to adjust the replica TOA according to the initial TOA adjustment; to provide a correlation signal for a correlation of the replica signal to the GPS signal; and to receive a feedback adjustment signal including a feedback frequency adjustment and a feedback TOA adjustment to drive the replica signal to correlate to the GPS signal, thereby acquiring the GPS signal; and a microprocessor section, including a memory including a learned frequency correction, to calculate the initial frequency adjustment from the learned frequency correction, to provide the initial adjustment signal and the feedback adjustment signal, to calculate the learned frequency correction based upon a difference between the initial frequency adjustment and the feedback frequency adjustment that correlates the replica signal to the GPS signal, and to store the learned frequency correction in the memory.

2. The GPS receiver in claim 1, wherein:

the microprocessor section is further to calculate the initial frequency adjustment based upon a portion of the learned frequency correction calculated from a portion of a selected time duration in the standby mode that has completed when the standby mode is interrupted before the selected time duration has completed.

3. The GPS receiver in claim 1, wherein:

the memory further includes a learned TOA correction; and the microprocessor section is further to calculate the initial TOA adjustment based upon the learned TOA correction, to calculate the learned TOA correction based upon a difference between the initial TOA adjustment and the feedback TOA adjustment that correlates the replica signal to the GPS signal, and to store the learned TOA correction in the memory.

4. A GPS receiver having a normal mode to track a GPS signal from one or more GPS satellites and to provide a location of the receiver, having a low power standby mode, and having a rapid acquisition of the GPS signal when the receiver enters the normal mode after a time duration in the standby mode, the receiver including:

a means for controlling the mode of the receiver for the normal mode and for the standby mode;

a reference oscillator to generate a continuous reference frequency signal in the normal mode and in the standby mode;

a correlator section to receive the reference frequency signal; to generate a replica signal having a replica frequency based upon the reference frequency signal; to receive an initial adjustment signal, including an initial frequency adjustment when the receiver enters the normal mode after a time duration in the standby mode; to adjust the replica frequency according to the initial frequency adjustment; to provide a correlation signal for a correlation of the replica signal to the GPS signal; and to receive a feedback adjustment signal including a feedback frequency adjustment to drive the replica signal to correlate to the GPS signal, thereby acquiring the GPS signal; and a microprocessor section, including a memory including a learned frequency correction, to calculate the initial frequency adjustment from the learned frequency correction, to provide the initial adjustment signal and the feedback adjustment signal, to calculate the learned frequency correction based upon a difference between the initial frequency adjustment and the feedback frequency adjustment that correlates the replica signal to the GPS signal, and to store the learned frequency correction in the memory.

5. The GPS receiver in claim 4, wherein:

the microprocessor section is further to calculate the initial frequency adjustment based upon a portion of the learned frequency correction calculated from a portion of a selected time duration in the standby mode that has completed when the standby mode is interrupted before the selected time duration has completed.

6. A method for rapidly acquiring a GPS signal from one or more GPS satellites in a GPS receiver when the receiver enters a normal mode after a time duration in a low power standby mode, the method including steps of:

providing a reference frequency oscillator to generate a reference frequency signal continuously during the standby mode and during the normal mode and to issue the reference frequency signal to a timer and to a correlator section;

providing a timer using the reference frequency signal to generate a reference TOA signal continuously during the standby mode and during the normal mode and to issue the reference TOA signal to the correlator section;

controlling the GPS receiver to enter the normal mode after the time duration in the standby mode by a means for controlling the mode;

calculating an initial frequency adjustment based upon a learned frequency correction retrieved from a memory in a microprocessor section;

providing an initial adjustment signal from the microprocessor section to the correlator section, the initial adjustment signal including the initial frequency adjustment and an initial TOA adjustment;

generating a replica signal in the correlator section, the replica signal including a replica frequency based upon the reference frequency signal and upon the initial frequency adjustment and including a replica TOA based upon the reference TOA signal and upon the initial TOA adjustment;

providing a correlation signal for a correlation between the replica signal and the GPS signal and issuing the correlation signal to the microprocessor section;

acquiring the GPS signal by correlating the replica signal to the GPS signal by providing a feedback adjustment signal from the microprocessor section to the correlator section, the feedback adjustment signal including a feedback frequency adjustment and a feedback TOA adjustment;

calculating the learned frequency correction from a difference between the initial frequency adjustment and the feedback frequency adjustment that correlates to the GPS signal; and storing the learned frequency correction in the memory.

7. The GPS receiver in claim 6, wherein;

the step of providing an initial adjustment signal further includes steps of providing a selected time duration for the standby mode and calculating the initial frequency adjustment from a portion of the learned frequency correction calculated from a portion of the selected time duration in the standby mode that has completed when the standby mode is interrupted before the selected time duration has completed.

8. The method of claim 6, wherein:

the step of providing an initial adjustment signal further includes of retrieving a learned TOA correction from the memory and calculating the initial TOA adjustment based upon the learned TOA correction; and the step of acquiring the GPS signal further includes steps of calculating the learned TOA correction based upon a difference between the initial TOA adjustment and the feedback TOA adjustment that correlates to the GPS signal and storing the learned TOA correction in the memory.

9. A method for rapidly acquiring a GPS signal from one or more GPS satellites in a GPS receiver when the receiver enters a normal mode to acquire the GPS signal after a time duration in a low power standby mode, the method including steps of:

providing a reference frequency oscillator to generate a reference frequency signal continuously during the standby mode and during the normal mode and to issue the reference frequency signal to a correlator section;

controlling the GPS receiver to enter the normal mode after the time duration in the standby mode;

calculating an initial frequency adjustment based upon a learned frequency correction retrieved from a memory in a microprocessor section;

providing an initial adjustment signal from a microprocessor section to the correlator section, the initial adjustment signal including the initial frequency adjustment;

generating a replica signal in the correlator section, the replica signal including a replica frequency based upon the reference frequency signal and upon the initial frequency adjustment;

providing a correlation signal for a correlation between the replica signal and the GPS signal to the microprocessor section;

acquiring the GPS signal by correlating the replica signal to the GPS signal by providing a feedback adjustment signal from the microprocessor section to the correlator section, the feedback adjustment signal including a feedback frequency adjustment;

calculating the learned frequency correction from a difference between the initial frequency adjustment and the feedback frequency adjustment that correlates to the GPS signal; and storing the learned frequency correction in the memory.

10. The GPS receiver in claim 9, wherein;

the step of providing an initial adjustment signal further includes steps of providing a selected time duration for the standby mode and calculating the initial frequency adjustment from a portion of the learned frequency correction calculated from a portion of the selected time duration in the standby mode that has completed when the standby mode is interrupted before the selected time duration has completed.

11. A GPS receiver having a normal mode to acquire a GPS signal from one or more GPS satellites and to provide a location of the receiver and a low power standby mode, and having a rapid acquisition of said GPS signal when the GPS receiver enters said normal mode after a time duration in said standby mode, comprising:

a reference oscillator for generating a continuous reference signal having a reference frequency during said normal mode and during said standby mode;

correlator means, coupled to the reference oscillator for receiving said reference signal, for receiving said GPS signal, for receiving an adjustment signal, and for providing a correlation signal in response to said reference signal, said adjustment signal, and said GPS signal; and microprocessor means, coupled to the correlator means for receiving said correlation signal and providing said adjustment signal including an initial frequency adjustment when the GPS receiver enters said normal mode, and including a memory including an executable program for calculating said initial frequency adjustment to correct for drift in said reference frequency during said standby mode.

12. The GPS receiver of claim 11, wherein:

said memory further includes a learned frequency correction and said executable program is further for calculating said initial frequency adjustment from said learned frequency correction.

13. The GPS receiver of claim 12, wherein:

said executable program is further for calculating said learned frequency correction based upon a comparison of said adjustment signal including said initial frequency adjustment and said adjustment signal causing a correlation between said reference signal and said GPS signal.

14. The GPS receiver of claim 11, further including:

a temperature sensor, coupled to the reference oscillator for measuring a temperature of the reference oscillator and providing said temperature to the microprocessor means; and wherein:

said memory further includes a frequency/temperature relationship representative of said reference frequency for said temperature; and said executable program is further for calculating said initial frequency adjustment based upon said temperature/frequency relationship and said temperature.

15. A method for rapidly acquiring a GPS signal from one or more GPS satellites in a GPS receiver when said receiver enters a normal mode alter a time duration in a low power standby mode, the method including steps of:

generating a continuous reference frequency;

receiving said GPS signal with said GPS receiver when said receiver enters said normal mode from said standby mode;

generating an initial frequency adjustment for correcting for a drift in said reference frequency during said standby mode; and providing a correlation signal for a correlation of said GPS signal with said reference frequency and said initial frequency adjustment.

16. The method of claim 15, wherein:

the step of generating an initial frequency adjustment includes steps of calculating said initial frequency adjustment from said correlation signal when said normal mode is entered, storing information for said initial frequency adjustment in a memory, and retrieving said information when said normal mode is re-entered after a time in said standby mode.

17. The method of claim 15, wherein:

the step of generating an initial frequency adjustment includes steps of providing a temperature/frequency relationship for said reference frequency for a range of temperatures, measuring a first temperature within said range when exiting said normal mode to enter said standby mode, measuring a second temperature within said range when re-entering said normal mode after said standby mode, and calculating said initial frequency adjustment based upon said first temperature, said second temperature, and said temperature/frequency relationship.

* * * * *